United States Patent [19]

Weir

[11] Patent Number: 4,671,780

[45] Date of Patent: Jun. 9, 1987

[54] FLEXIBLE COUPLING WITH DEFORMABLE BEAM ELEMENTS

[75] Inventor: David F. Weir, San Ramon, Calif.

[73] Assignee: Westinghouse Electric Corp., Pittsburgh, Pa.

[21] Appl. No.: 793,044

[22] Filed: Oct. 30, 1985

[51] Int. Cl.⁴ ............................................. F16D 3/74
[52] U.S. Cl. ................................... 464/85; 464/100; 464/147
[58] Field of Search .................. 403/374; 464/51, 84, 464/85, 86, 87, 92, 96, 100, 101, 106, 147, 903, 81; 267/158

[56] References Cited

U.S. PATENT DOCUMENTS

| | | | |
|---|---|---|---|
| 1,393,582 | 10/1921 | Steenstrup | 464/106 |
| 1,634,965 | 7/1927 | Taylor | 464/81 |
| 1,865,330 | 6/1932 | McLeod | 464/81 |
| 1,935,730 | 11/1933 | Smith | 464/81 |
| 2,301,659 | 11/1942 | Ricefield | 464/903 X |
| 2,479,278 | 8/1949 | Tessendorf et al. | 464/85 |
| 2,904,976 | 9/1959 | Bay et al. | 464/85 |
| 2,924,082 | 2/1960 | Reich | 464/86 X |
| 3,469,417 | 9/1969 | Wakelin | 464/85 X |
| 4,518,368 | 5/1985 | Peretti | 464/85 X |

FOREIGN PATENT DOCUMENTS

| | | | |
|---|---|---|---|
| 1004439 | 3/1957 | Fed. Rep. of Germany | 464/112 |
| 290135 | 12/1970 | U.S.S.R. | 464/85 |

Primary Examiner—Daniel P. Stodola
Attorney, Agent, or Firm—F. J. Baehr, Jr.

[57] ABSTRACT

A flexible coupling for joining two rotating shafts, the coupling having opposed hubs one attached to each shaft, the hubs each having an annular array of radical grooves on opposing faces thereof and a plurality of generally rectangular shaped laminated graphite epoxy plates with radially extended projections which are provided with an integral laminated elastomer/metal shear sandwich structure and are held in the radial grooves by restraint fittings attached to the hubs.

6 Claims, 4 Drawing Figures

FIG. I

FLEXIBLE COUPLING WITH DEFORMABLE BEAM ELEMENTS

BACKGROUND OF THE INVENTION

This invention relates to couplings between power transmission shafts and more particularly to such couplings having a plurality of radially oriented flexible plates disposed between two hubs.

Various types of flexible couplings are used to allow for misaglignment between two shafts but such couplings usually require some type of lubrication.

SUMMARY OF THE INVENTION

In general a flexible coupling for a rotatable shaft, when made in accordance with this invention, comprises a pair of axially opposed hubs, the hubs having a circular array of radial grooves disposed on opposing faces thereof, and a plurality of generally rectangular plates having an area adjacent four corners of the plate covered on both sides with an elastomer and the elastomer covered portion fitting tightly in the grooves. The coupling also comprises means for keeping the plates in the grooves removably attached to the hubs, whereby the plates can be replaced without removing the couplings from the shafts.

BRIEF DESCRIPTION OF THE DRAWINGS

The objects and advantages of this invention will become more apparent from reading the following detailed description in conjunction with the accompanying drawings, in which.

DESCRIPTION OF THE PREFERRED EMBODIMENT

Figure 1:
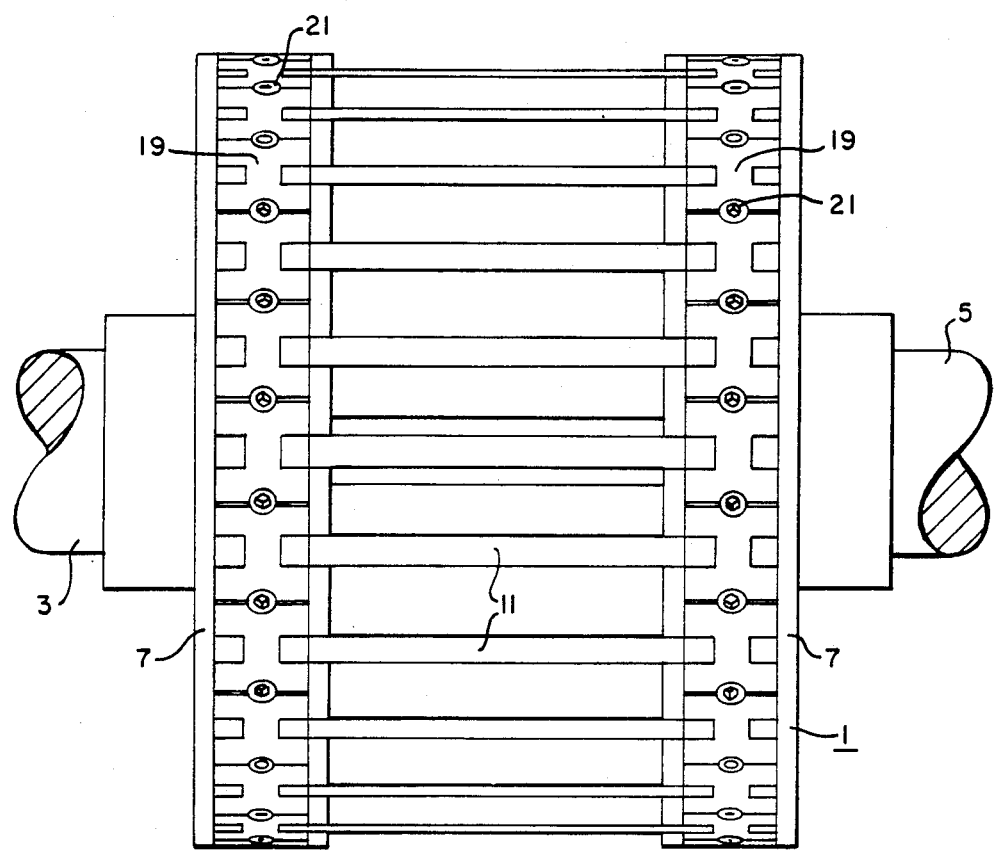
FIG. 1 is an elevational view of a coupling made in accordance with this invention.
Figure 2:
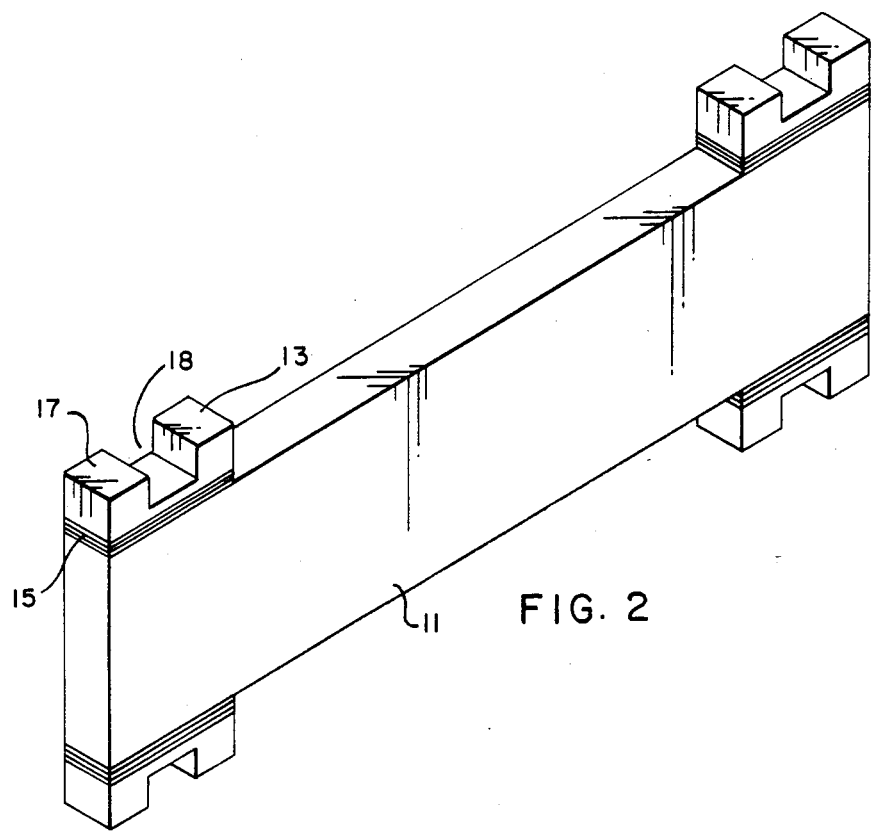
FIG. 2 is a perspective view of a flexible plate used in the coupling.

Referring now to the drawings in detail and in particular to FIG. 1 there is shown a flexible coupling 1 disposed between two shafts 3 and 5. The coupling 1 comprises a pair of axially opposed hubs 7 having a circular array of radial grooves 9 disposed on opposing faces of the hubs 7. A plurality of generally rectangular shaped flex plates 11, as shown best in FIG. 2, have an area 13 adjacent the four corners referred to as projections which contain a laminated elastomer metal shear sandwich structure 15 and a metallic restraint fitting 17. The metal and elastomer sheets forming the laminated elastomer and metal shear sandwich 15 are interdigitated and disposed in a plane perpendicular to the major surfaces of the flex plates 11 and contiguous only with the radially inner and outer margins of said plates 11, and the metallic restraint fitting 17 is attached to the outer sheet. The elastomer structural projections 13 fit tightly into the radial grooves 9 in the hubs 7. The projections 13 extend out radially from the corners of the plates 11 and each have a notch 18 provided as an integral part of the restraint fitting 17. p As shown in FIGS. 1 and 2, a dog bone arcuate shaped plate 19 fits in the notch 18 forming clips which are fastened radially to the hubs 7 by socket head cap screws 21 or other fasteners forming retainers for the plates 11, but are so attached that the plates 11 can be removed and replaced without removing the coupling 1 from the shafts 3 and 5. The screws 21 are disposed at the juncture of the arcuate-shaped plates 19 whereby each screw makes a purchase on two adjoining arcuate plates 19 to secure them to the hubs 7. Longitudinal plate 11 to hub 7 restraint is provided by circumferential slots 20 into which the dog bone arcuate shaped plates 19 are fit.

Preferably the flex plates 11 are formed from laminated graphite epoxy or other material having a high fatigue strength, low weight, good damping properties, and resistance to most environmental degradation.

Figure 4:
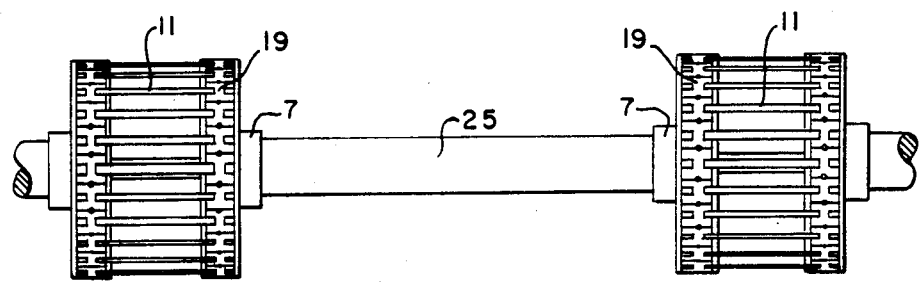
FIG. 4 is an elevational view of two couplings in tandem.
Figure 3:
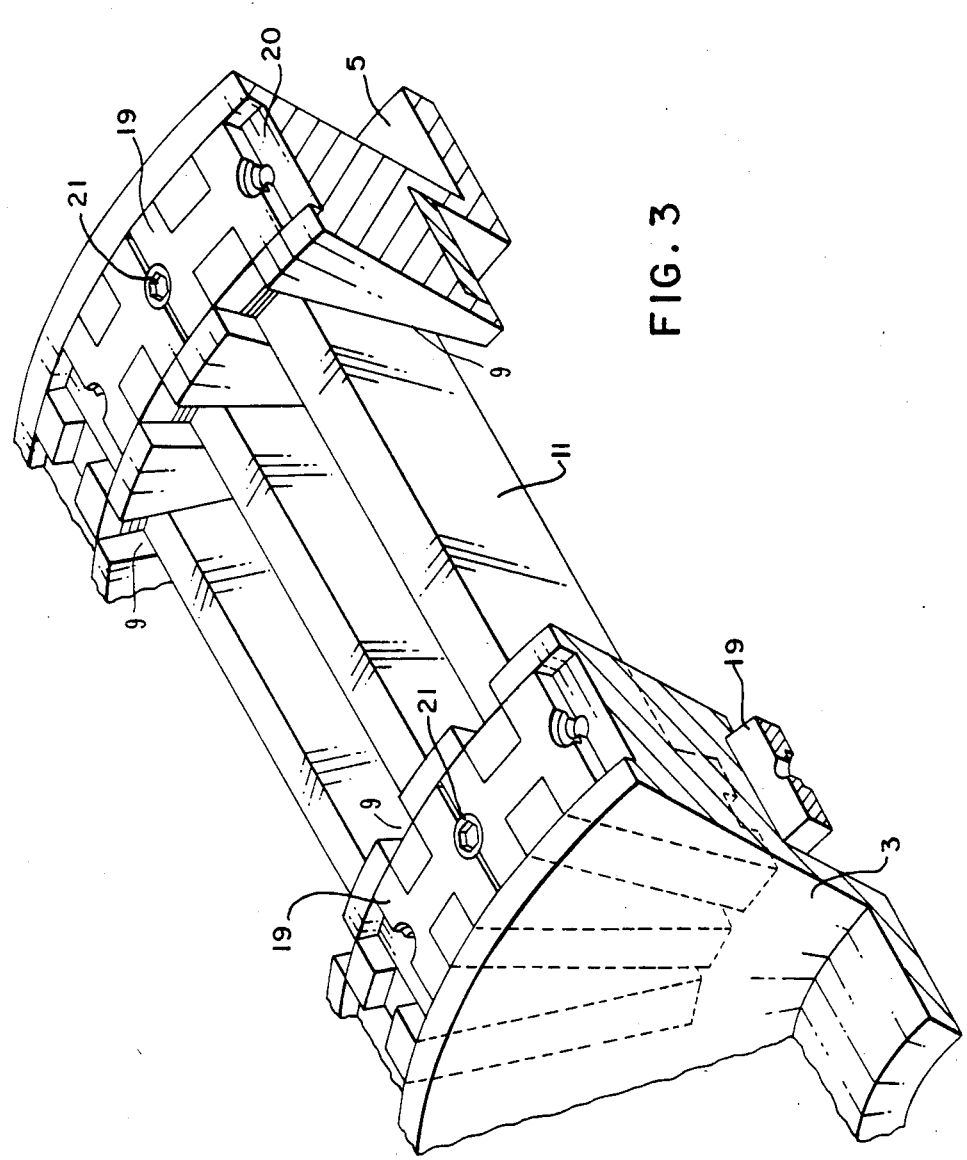
FIG. 3 is a partial perspective view of the coupling.

The coupling is either single ended as shown in FIG. 1 or double ended as shown in FIG. 4 having two couplings joined together with a stub shaft 25.

The flex plates 11 act as beam elements. Each plate 11 has four elastomeric shear sandwich regions 13 adjacent the corners to position and support the plates 11 and provide appropriate axial and bending characteristics for specific applications.

The coupling hereinbefore described advantageously provides noise attenuation capability by virtue of dissimilar coupling spring rates as compared to adjacent shaft elements and inherent damping of laminate and elastomer components; engineerable spring rates due to the simplicity of the flex beams and elastomer shear sandwiches; reduced size and weight compared to equivalent couplings; easy inspection, maintenance, and servicing without disassembling the coupling; failure safe design as failure of one flex plate would not lead to eminent failure of the coupling since individual fiber strain failures would result in reduced load on the one beam element with a corresponding increase in load on the other beam elements; detectable failure as the beam elements are stressed by bending and outer fibers would fail and be visibly detectable; passive coupling design requiring no oil lubrication; and torsional vibration attenuation due to damping of the composite flex plates.

What is claimed is:

1. A flexible coupling for rotatable shafts, said coupling comprising:

a pair of axially opposed hubs attached to said shafts;

each of said hubs having a circular array of radially oriented grooves disposed on opposing faces thereof and a circumferential groove in the outer periphery of each hub;

a plurality of generally rectangular-shaped plates having a region adjacent each of the four corners thereof provided with a laminated elastomer metal shear sandwich structure in the form of projections extending radially adjacent each corner, the shear sandwich structure being terminated by a metallic restraint member having a centrally disposed notch;

said elastomeric shear sandwich structure fitting tightly into said radial grooves; and arcuate dog bone-shaped members fastened to said hubs by fasteners and extending over the ends of the radially oriented grooves and retained axially in said circumferential groove, said dog bone-shaped arcuate members having a narrow center portion which fits the notch of the restraint member on the terminal ends of the shear sandwich structure, whereby said rectangular plates can be replaced without removing said coupling from said shafts.

2. A coupling as set forth in claim 1, wherein the plates are formed from a composite material.

3. A coupling as set forth in claim 2, wherein the composite material is a laminated graphite epoxy.

4. A coupling as set forth in claim 1, wherein the fasterners for keeping said dog bone-shaped members in said grooves comprises a plurality of machine screws attaching said dog bone-shaped members to said hubs.

5. A coupling as set forth in claim 4, wherein the machine screws are disposed at the juncture of adjacent dog bone-shaped members, whereby each machine screw clamps two adjacent dog bone-shaped members.

6. A coupling as set forth in claim 1 wherein each hub has a bore forming an inner hub periphery and a circumferential groove disposed in the inner hub periphery for receiveing the arcuate dog bone-shaped members.

* * * * *